8414X

W. SUTTON.

ROTARY ENGINE.

Patented Sept. 18, 1834.

THE NORRIS PETERS CO., PHOTO-LITHO., WASHINGTON, D. C.

84114X Sept. 18. 1834

William Sutton's Rotary Engine
Letters Patent

The Schedule referred to in these Letters Patent (and making part of the same containing a description in the words of the said William Sutton himself of his improvement in the mode or manner of applying the action and reaction of Steam for the purpose of obtaining a rotary motion applicable to Machinery entitled "Suttons Rotary Engine"

To all to whom these Presents shall come

Figure 1:
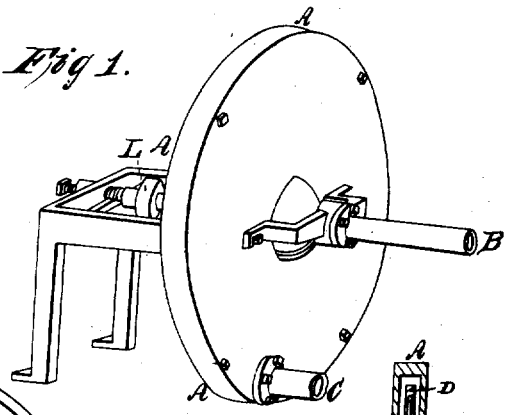
Figure 2:
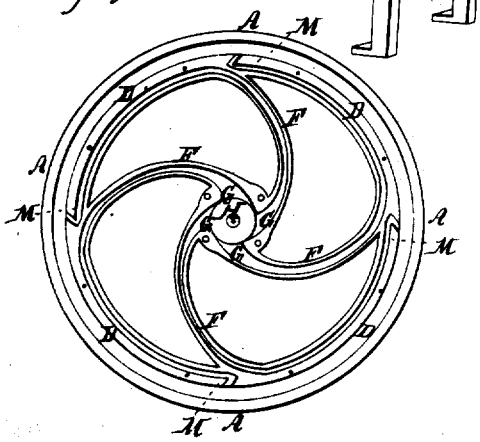
Figure 3:
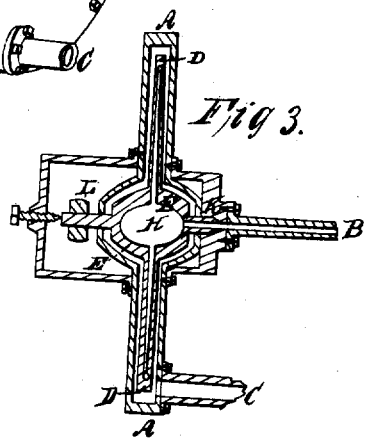

Be it known that I, William Sutton of Geneva, Ontario County State of New York, Cabinet Maker have invented a new and useful improvement in the mode or manner of applying the action and reaction of Steam for the purpose of obtaining a rotary motion applicable to Machinery (and that the following is a full and exact description of the said improvement) in the mode or manner of applying the action and reaction of Steam as invented by me Description or Specification The drawing herewith exhibited contains three figures viz: Figure 1. is a perspective view of "Suttons Rotary Engine" Figure 2. is a section shewing the hollow expansion Hub, the channels in the arms and rim of the wheel, Buckets and orifices: Figure 3. represents a section parallel with the axis showing the hollow axis through which the steam is conveyed into the hollow hub The following is the improvement in the mode or manner of applying the action and reaction of Steam for the purpose above mentioned. (Note: The Roman letters A. B. C, &c) refer to those on the figures 1. 2, and 3. of the drawing herewith exhibited A is a strong case made of iron or other suitable metal inclosing the wheel. B is an induction pipe of any suitable metal, for conveying steam directly into the hollow hub H. through the hollow axis F. This should be large enough to convey more steam into the hollow hub than can be discharged through the channels of the arms & by the orifices M. the object being to allow the steam to expand and communicate as rapid a motion thereby to the wheel as the direct communication of it through the induction pipe B will give a cause. C. The 10 8414x Sept. 18, 1834 eduction pipe of any suitable metal to convey the steam from the case A
into the outward air, or into a condensing tub. D. The rim of the wheel
of any suitable metal & size in which there is a hollow diminishing from
the arms F, to the orifices M. This hollow should be near to the inner
edge of the rim, the periphery being solid. E. The hollow expansion hub
of a conical form of any suitable metal and size sufficiently strong to
bear a pressure of steam equal to that of the boiler used. F, The hollow
arm (of the same substance as the wheel) springing from the hollow ex-
pansion hub and affixed to the hollow rim D, These arms may be straight or
curved, and any number may be used or added. G. Channels in the arms
F, to be considerably larger say two thirds larger than the hollow in the
rim of the wheel, and ending on buckets opposite to the orifices M.
H. Hollow expansion hub of any suitable metal and size of a concave
form. see E. I. Hollow axis connected with the box K. by means of
screws or rivets, through which the steam is conveyed into the hollow hub
H. K. Box of any suitable metal for the hollow axis I to turn in; which
should be rendered sufficiently tight to prevent steam from escaping. +
L. Pulley attached to the solid axis of the hub E. to which any required
Machinery may be attached. this pulley may be of any suitable matter
and size. M. Orifices pierced through the rim of the wheel D, running
diagonally at about 45 degrees from a line drawn through the centre
of the hub H. to the rim of the wheel, the size of these Orifices will de-
pend on the power required to be given to the engine and may be from
1/8 of an inch to any size according to the power desired. the hollows
of the hub and channels of the arms and rim of the wheel will also be
increased according to the power desired to be communicated. It
is to be understood, that what I claim as my invention or improvement
is the hollow expansion hub, together with the hollow wheel, by means
of which the steam is confined until it is conveyed on to the stops or
buckets across the hollow within the rim of the wheel, which causes the
wheel to move in the same direction of the steam; also the manner in
which the steam is discharged from the wheel, it being discharged in
a contrary direction from that in which the wheel moves, thereby obtain- 8414x Sept 18, 1834 487 ing by the combination of the action and reaction, the assistance of the
reaction so as to cause it to work in concert with the direct action.
It is obvious that this improvement may be applied to machinery
in any position; and it is therefore deemed unnecessary to specify more
particularly the application than is seen in such a Machine as the
drawing herewith exhibited represents. It may be applied to Mill
and other Machinery or to propelling carriages on rail roads or on
common roads. Philadelphia August 9th 1834.

Witnesses
J. Badger
Wm J. Bedlock

Wm Sutton

Drawing

Exd.
W.C.

1010 word